H. A. TWIGG & G. ANDERSON.
VALVE CONSTRUCTION.
APPLICATION FILED DEC. 1, 1916.
1,233,937.
Patented July 17, 1917.
3 SHEETS—SHEET 1.
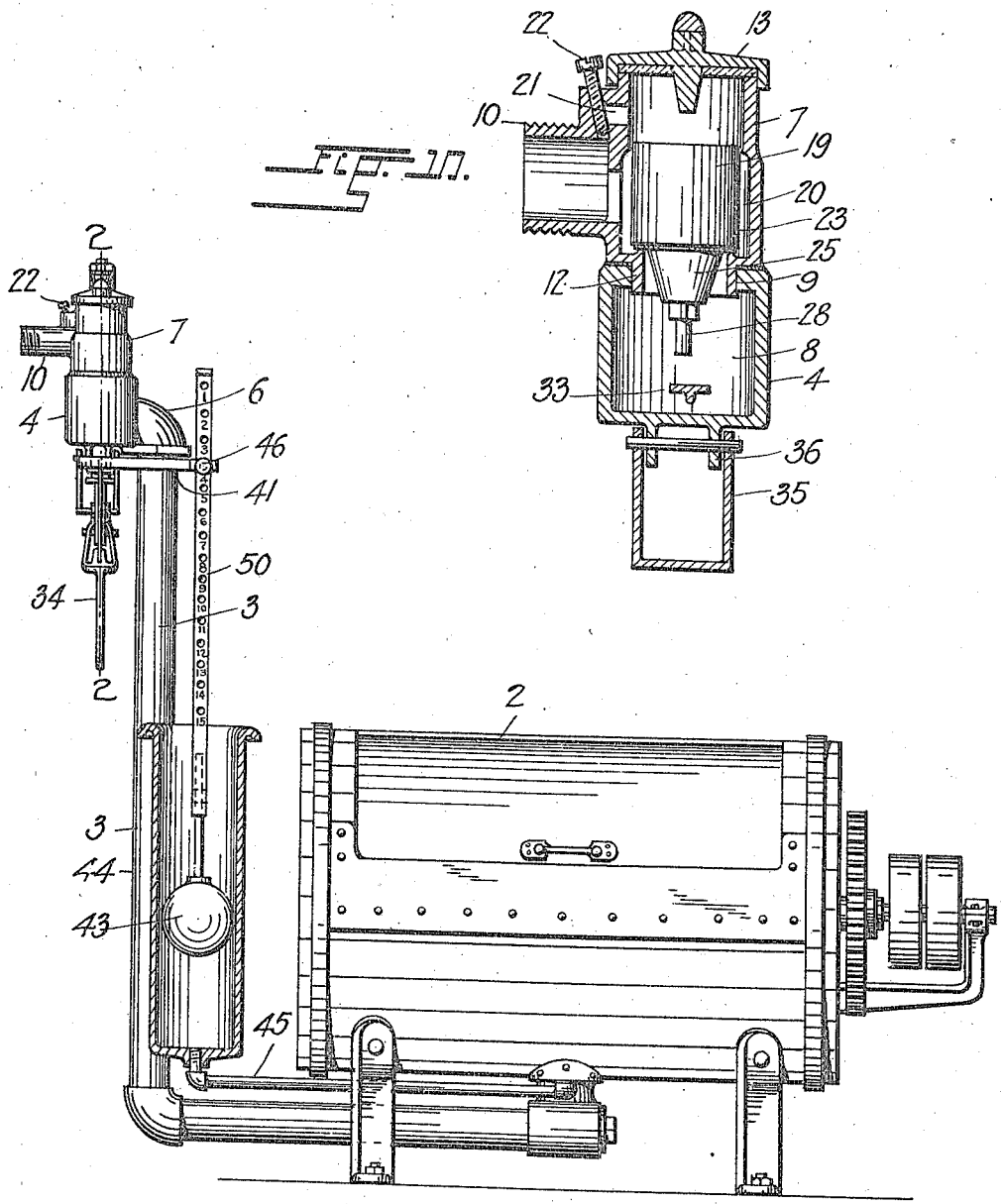
WITNESSES
INVENTORS
H. A. TWIGG AND
GUSTAVE ANDERSON.
BY
ATTORNEY.

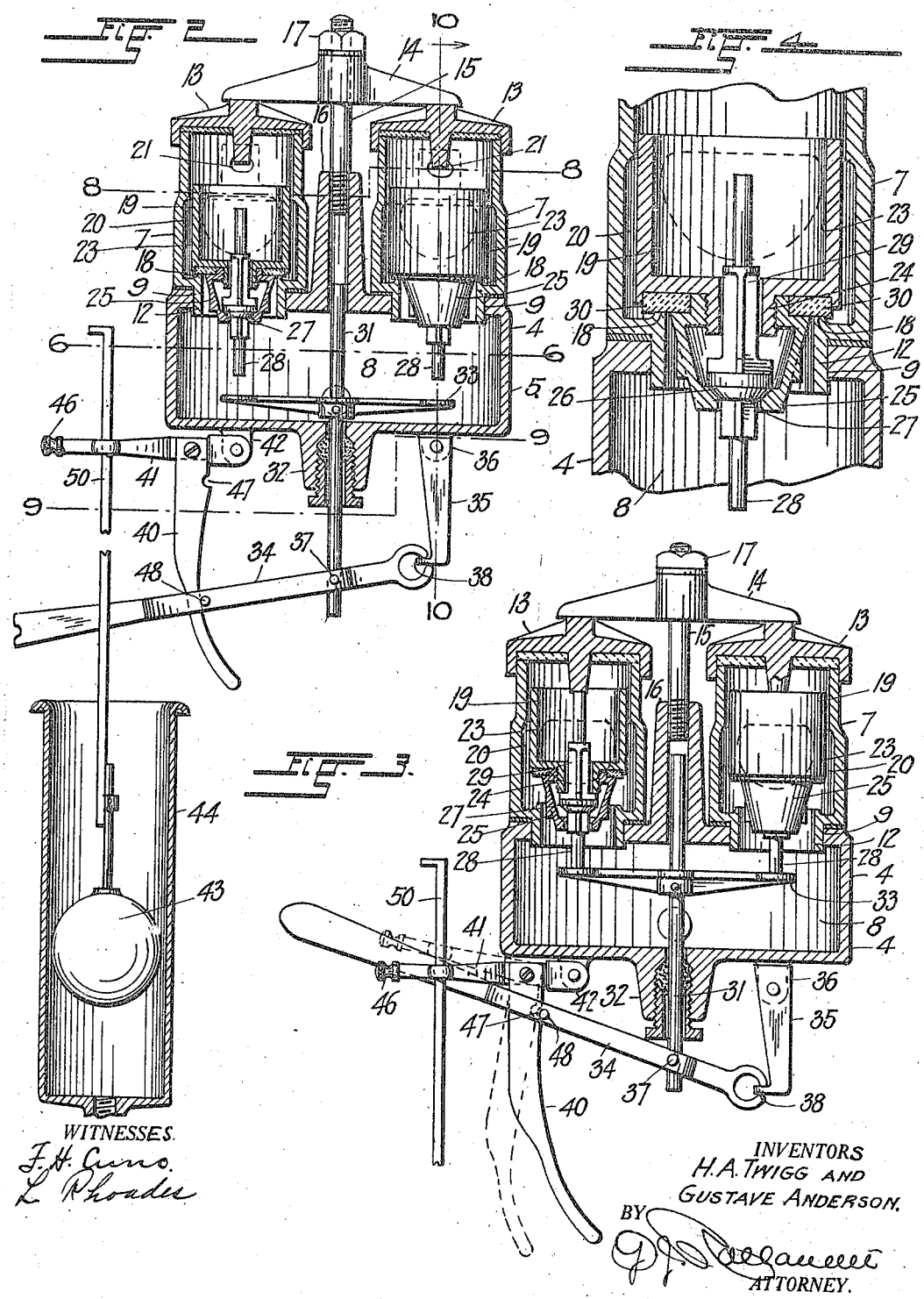

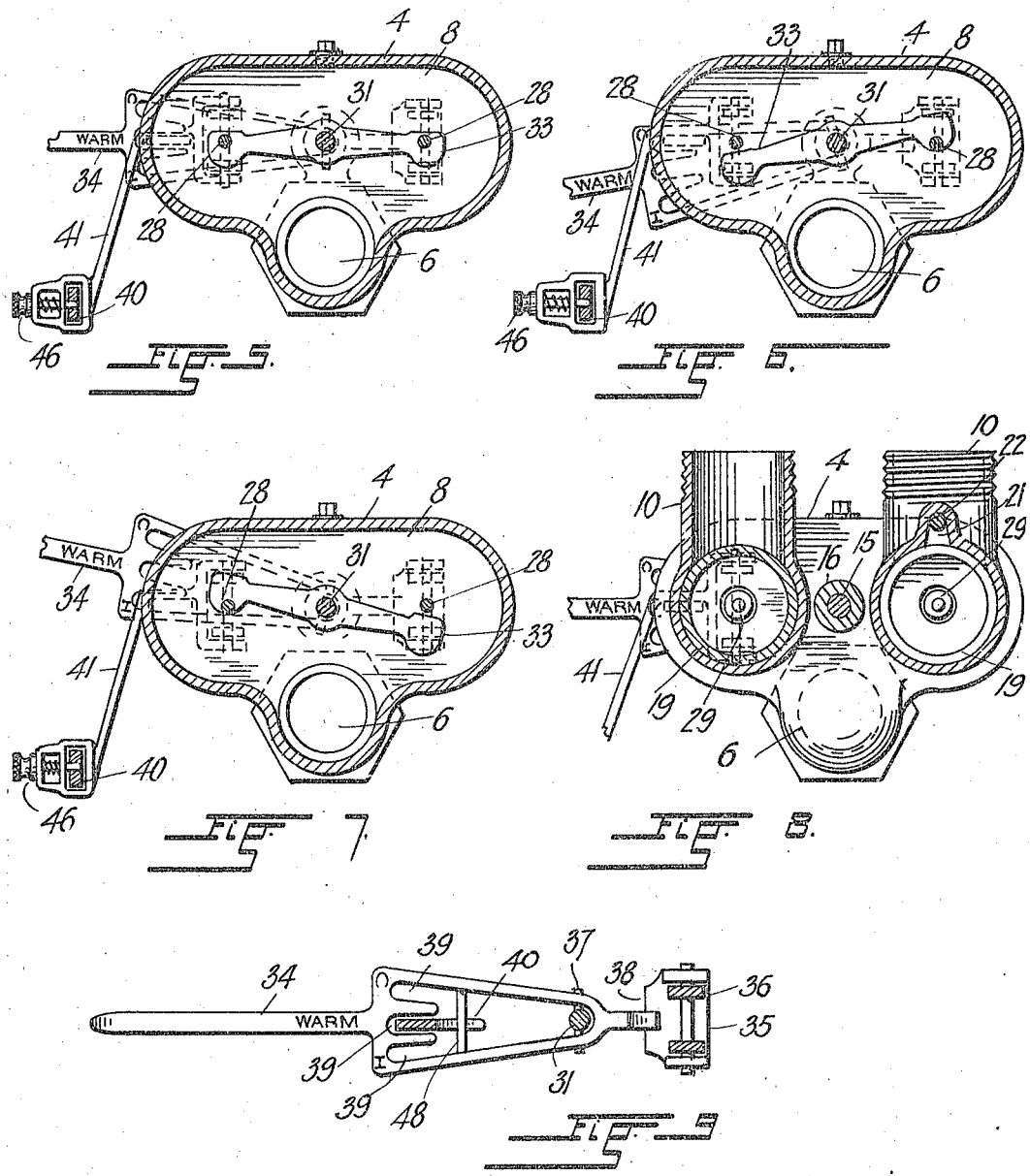

UNITED STATES PATENT OFFICE.

HENRY A. TWIGG AND GUSTAV ANDERSON, OF DENVER, COLORADO.

VALVE CONSTRUCTION.

1,233,937.  Specification of Letters Patent.  Patented July 17, 1917.

Application filed December 1, 1916. Serial No. 134,443.

*To all whom it may concern:*

Be it known that we, HENRY A. TWIGG and GUSTAV ANDERSON, citizens of the United States, residing at Denver, in the county of Denver and State of Colorado, have invented certain new and useful Improvements in Valve Constructions, of which the following is a specification.

This invention relates to duplex valves and more particularly to valves designed to control the supply of hot and cold water to receptacles such as those used in washing-machines of the power-driven type employed in laundries.

It is the primary object of our invention to provide a simple valve construction which operates without the assistance of springs and which includes a single selective actuating element to establish connections between the receptacle of a washing machine and sources for the supply of hot and cold water.

Our invention furthermore comprises certain new and useful improvements in the construction of the valves which control the passage of water from the sources of supply to the receptacle, the arrangement of the means by which they are actuated to move to a wide open position by fluid-pressure, and the construction and arrangement of the valve-housing and the parts by which it is connected with the sources of hot and cold water supply.

The above and other objects all of which will be fully disclosed in the course of the following description, we attain by the mechanism shown in the accompanying drawings in which—

Figure 1 represents a side elevation, partially in section, of our improved valve-construction in operative connection with a washing-machine, Fig. 2, a vertical section through our improved valve taken along the line 2—2, Fig. 1, and drawn to an enlarged scale, Fig. 3, a view similar to that of Fig. 2, showing the valves which control the flow of liquid, in the open position, Fig. 4 an enlarged, fragmentary sectional view of one of the valves in its closed position, Fig. 5, a horizontal section taken along the line 6—6, Fig. 2, Fig. 6, a similar section showing the position of the valve-actuating mechanism in the position to which it is adjusted for opening one of the two valves comprised in our invention, exclusive of the other, Fig. 7, a similar section showing the actuating mechanism in the position in which it causes the other valve to open, exclusive of its companion, Fig. 8, a horizontal section taken along the line 8—8, Fig. 2, Fig. 9, a section on the line 9—9, Fig. 2, and Fig. 10, a section taken along the line 10—10, Fig. 2.

Referring more specifically to the drawings in which like reference characters designate corresponding parts through the several views, 2 designates the receptacle of a washing machine, and 3 a pipe or conduit connecting the same with sources of hot and cold-water supply through the intermediary of our improved valve-construction which is disposed above the level of the water in the receptacle at the end of an upright part of the pipe.

The valve-construction comprises a housing 4 which is composed of a body-part 5 provided with an elbow 6 for its connection with the pipe 3, and two valve-casings 7 which connect the body-part with the sources of hot and cold water supply.

The body-part of the housing provides a chamber 8 into which the water flows past valves seated in the casings 7 which connect with openings 9 in the top of the body-part and which are provided with laterally projecting nipples 10 for their connection with the pipes through which the hot and cold water is supplied.

The valve-casings are rotatably fitted in the respective openings 9 of the body of the housing so that the position of their respective nipples may be changed in accordance with the location of the pipes with which they are connected.

Each valve-casing consists of a hollow cylinder having at its lower end a neck 12 of reduced diameter which fits within the respective opening 9 at the top of the body-part.

Caps 13 close the upper ends of the cylindrical casings, and a clamp is provided to hold the caps in place and to secure the casings in their adjusted position with relation to the body of the housing.

This clamp comprises in its preferred form, a yoke 14 which at its ends engages central protuberances of the caps, a bolt 15 which is secured in an upright position at the upper end of an upright axially bored turret 16 formed on the body-part of the housing between the two casings, and a nut 17 screwed upon the threaded upper end of the bolt which extends through a central opening of the yoke.

Each valve-casing has around the orifice of its neck, a circular seat 18 for the support of a cylindrical valve 19 which has a working fit in the upper portion of the casing and which is spaced from the lower portion of the same which interiorly is enlarged in diameter to provide an annular passage 20 around the valve and between the respective nipple 10 through which water is admitted, and the neck 12 through which it is discharged into the chamber 8 provided by the body of the housing.

Each valve-casing is furthermore provided with a by-pass 21 adapted to connect its upper portion above the valve 19, with the nipple 10 for the purpose of returning the valve to its seat by pressure of the inflowing liquid.

The flow of water through the by-pass of each casing is controlled by a screw 22 which is adjustable from a point outside the casing.

The valves of the device are identical in form and construction and consist as best shown in Fig. 4 of the drawings, of a hollow cylindrical cup-shaped member 23 which fits in the upper portion of the casing and which at its bottom has a central nipple 24 which when the valve is in its closed position, extends axially within the neck 12 of the respective casing.

The nipple 24 is exteriorly threaded for the attachment of an exteriorly cone-shaped hollow extension 25 which in its lower end has an opening surrounded by a seat 26 for the support of a priming valve 27 which in the operation serves to vent the portion of the casing above the valve and thereby permit of the valve 23 being buoyed to a wide-open position by the fluid-pressure in the chamber 8.

The priming valve consists of a valve-head fitting the seat around the opening in the lower end of the extension of the valve-body 23, a stem 28 which extends downwardly for engagement with the operating mechanism hereinafter to be described, and a longitudinally channeled guide-stem 29 which extends through the tubular nipple 24 on the body 23 of the valve.

A gasket 30 disposed between a marginal annular shoulder on the body 23 and the upper portion of the extension 25, engages the seat 18 upon which the valve is supported and insures a fluid-tight contact therewith.

The actuating mechanism of our improved valve-construction comprises a lifting element which consists of a rod 31 fitted for longitudinal movement in the bore of the hollow turret 16 to which the bolt 15 is attached, and a stuffing box 32 at the bottom of the housing, which is formed in axial alinement with said bore.

The rod 31 carries within the chamber 8 of the housing a cross-piece 33 which provides two laterally projecting arms capable of engaging the ends of the stems 28 of the priming valves to lift them off their respective seats.

When the arms on the rods 31 extend in the plane of the axes of the two valves as shown in Fig. 5 of the drawings, their upward movement will compel the valves to open simultaneously for the admission of water from both valve-casings to the chamber 8.

By turning the rod in its bearings, the arms may be positioned as shown in Figs. 6 and 7 to engage one of the valves exclusive of the other and thereby admit either hot or cold water to the chamber and the receptacle of the washing machine connected therewith.

The rod 31 may be turned to any one of the three distinctive positions above referred to and subsequently lifted for the engagement of its arms with the stems of the valves 27, by means of a lever 34 which is fulcrumed on a hanger 35 pivotally suspended from a bracket 36 on the underside of the casing and attached at the lower end of the rod 31 as at 37.

The fulcrum of the lever is established by a flange 38 on the hanger 35, which extends loosely into a slot at the end of the lever 34 and thus permits of a lateral movement of the latter for the purpose of imparting a partial rotation to the rod for adjustment of the cross-piece 33 to the positions mentioned hereinbefore.

The lever 34 has between its free end which is formed to provide an operating handle, and the point at which it is pivotally connected with the end of the rod 31, three guide-grooves 39 which are open at one of their ends to admit a flat bar 40 which in the operation of the lifting mechanism combines the functions of a guide and a latch to hold the cross-piece 33 in its adjusted position during upward movement of the rod 31 and to lock the lever at the end of its upward movement until it is released by adjustment of the bar.

This guide and latch is attached to a lever 41 which at one of its ends is fulcrumed to a bracket 42 on the underside of the housing and which adjacent its opposite extremity is connected with the upright stem 50 of a float 43 supported upon a body of water in an open vessel 44 which is connected with the receptacle of the washing machine by means of a pipe 45.

The connection between the float stem and the lever 41 is made by an adjustable screw 46 which permits of the float being lifted to any desired elevation with relation to the receptacle and to thereby determine the moment at which the float will be buoyed by liquid entering the vessel when the receptacle is being supplied with water through the medium of our improved valve-construction.

To facilitate the adjustment of the float to the desired elevation, its stem has been graduated and numbered as shown in Fig. 1.

The latch 40 has adjacent its upper end a notch 47 to receive a cross-pin 48 on the lever 34 for the purpose of locking the lifting device in the position in which either one of the valves or both valves have been lifted from their seats by engagement of the cross piece 33.

In the operation of our invention the upper end of the conduit 3 is connected with the elbow 6 on the body part of the housing to deliver the water discharged therefrom into the receptacle of the washing machine, and the pipes connecting with the source of hot and cold water supply are attached to the side nipples 10 of the casings 7 after the latter have been turned in the openings 9 of the body in which they are fitted to bring their respective nipples in alinement with the pipes to which they are secured.

After the float has been raised or lowered to the desired elevation, the parts of our improved valve-construction are in the proper condition to admit hot or cold water either separately or simultaneously to the receptacle of the washing machine.

The lower portion of the latch 40 is reduced in width to permit of lateral adjustment of the lever 34 for moving one of its grooves 39 into register with the upper wider portion of the latch.

When it is desired to supply the receptacle with either hot or cold water, the lever 34 which is normally suspended below the wider portion of the latch 40, is laterally adjusted until an outer one of the three grooves 39 is positioned to admit the upper portion of the latch when the lever is again moved upwardly.

By lifting the lever subsequently along the latch, the rod 31 and the cross-piece 33 which together constitute the valve lifting device, are raised until the cross-pin 48 on the lever enters the notch of the latch and the lever is in consequence locked in its elevated position.

The lateral adjustment of the lever imparted a rotary movement to the lever 31 and thereby positioned the cross-piece 33 thereof to engage either one of the two of the priming valves during subsequent upward movement of the lever, as shown in Figs. 6 and 7 of the drawings.

When the priming valve on one of the valves 19 is unseated by the engagement of the respective arm of the lifting device, with its stem 28, the water normally contained in the upper portion of the respective valve-chamber, discharges past the priming valve into the chamber 8 and thereby relieves the valve from the fluid-pressure which held it upon its seat.

The liquid pressure in the chamber 8 now raises the main valve 23 by its buoyant effect thereon and thereby opens widely the connection between the inlet of the valve-chamber provided by the respective nipple 10, and the receptacle of the washing machine which is connected with the elbow 6 of the body 5 by the upright pipe 3.

The parts are maintained in this condition and the water will in consequence continue to flow into the receptacle until the liquid reaches a level in the latter at which it buoys the float in the vessel 44.

When this takes place, the upward movement of the float disengages the latch from the pin 48 on the lever through the medium of the lever 41, and the therewith connected lifting device drops in consequence to its original position in which the cross-piece 33 engages the bottom of the chamber 8.

The disengagement of the cross piece from the stem of the valve 27 it had previously unseated, permits the valve to be moved to its seat by the fluid pressure, with the result that the cup-shaped valve member 23 fills with water which enters the upper portion of the casing through the by-pass 21.

The valve 19 is in consequence compelled by fluid-pressure to move downwardly until it again engages its seat and thereby closes the connection between the source of water supply and the chamber 8 which connects with the receptacle 2, it being understood that the conical shape of the valve extension 25 gradually narrows the annular passage between the casing and the chamber 8 and thereby prevents the valve from closing suddenly.

When it is desired to supply hot and cold water simultaneously to a receptacle of the washing machine, the lever 34 is placed in a position in which the latch occupies the middle one of the three grooves 39 and the cross-piece of the lifting device is in consequence positioned in the vertical plane of the axes of the two valves to simultaneously engage the stems of both priming valves, as shown in Fig. 5, after which the lever is lifted as before.

To indicate the position to which the lever is adjusted for the supply of hot and cold water to the receptacle, the two outer grooves which are occupied by the latch to connect the chamber 8 respectively with the sources of hot and cold water supply, are marked by the letters "H" and "C", stamped or cast into or upon the metal of which the lever is composed, and the middle groove in which the latch is placed to admit both hot and cold water to the chamber, is marked "Warm".

The markings are preferably placed on both sides of the lever and the brackets 42 and 36 to which the hanger 35 and the lever 41 are attached, are placed at equal distances from the axis of the stuffing-box 32 through which the rod 31 extends, so that if so desired the position of the lever may be reversed.

It will be readily seen from the foregoing description that our improved valve-construction is operated to supply hot or cold water either separately or simultaneously to the receptacle of a washing machine, by a simple adjustment of a single operating lever, that the main valves are unseated and returned to their closing position by fluid-pressure and without the assistance of springs, that the position of the inlet openings of the valve-casings is easily adjusted to conform with the positions of the pipes which connect them with the sources of hot and cold water supply, and that by removing the single nut of the clamping appliance, access is afforded to all the operating parts of the mechanism for cleaning and repairs.

Having thus described our improved valve-construction in the best form at present known to us, we desire it understood that modifications in the construction and arrangement of its parts may be resorted to within the spirit of our invention as set forth in the following claims:

1. In a valve-construction of the character described, a housing including a body-part having a fluid-outlet, casings loosely connected with said body-part and having fluid-inlets, and a clamping appliance comprising a bolt fixed on the body-part, a yoke on said bolt engaging the casings to hold them in position relative to the body-part, and a nut on the bolt for securing the yoke.

2. In valve-construction of the character described, valves controlling separate fluid-passages, means for the operation of said valves, including a member mounted for rotary and rectilinear movements and adapted to operatively engage either one of said valves singly or both valves simultaneously, a lever fulcrumed for lateral adjustment and operatively associated with said member to rotate it to any of a plurality of determinate positions and to move it in operative engagement with the valves, a latch for securing said lever in an active condition, and means operated by a supply of fluid past the valves, for the adjustment of the latch to release the lever.

3. In valve-construction of the character described, valves controlling separate fluid-passages, means for the operation of said valves, including a member mounted for rotary and rectilinear movements and adapted to operatively engage either one of said valves singly or both valves simultaneously, a guide, and a lever operatively associated with said member to rotate it to any of a plurality of determinate positions and to move it in operative engagement with the valves, said lever having a plurality of guide-engaging grooves, and a fulcrum permitting of its lateral adjustment to bring any of its said grooves in register with said guide.

4. In valve-construction of the character described, valves controlling separate fluid-passages, means for the operation of said valves, including a member mounted for rotary and rectilinear movements and adapted to operatively engage either one of said valves singly or both valves simultaneously, a guide adapted to lock said lever in an active condition, and a lever operatively associated with said member to rotate it to any of a plurality of determinate positions and to move it in operative engagement with the valves, said lever having a plurality of guide-engaging grooves and a fulcrum permitting of its lateral adjustment to bring any of its said grooves in register with said guide.

5. In valve-construction of the character described, a receptacle, a housing having a fluid-outlet in connection with said receptacle, and two fluid-inlets, passages separately connecting said fluid-inlets with said fluid-outlet, valves controlling said passages, means for the operation of said valves, including a member adjustable to determinate positions to operate either valve singly or both valves simultaneously, and an operating member capable of adjusting the first-mentioned member to its said positions and to move it for opening said valves, a latch adapted to lock said operating member in its active condition, a vessel in connection with said receptacle, and a float in said vessel, in operative connection with said latch to release the operating member when the water in the receptacle reaches a determinate level.

6. In valve-construction of the character described, valves controlling separate fluid-passages, means for the operation of said valves including a member adjustable to determinate positions to operate either valve singly or both valves simultaneously, and an operating member capable of adjusting the first-mentioned member to its said positions and to move it for opening said valves, a latch adapted to lock said operating member in its active condition, and means operated by a supply of fluid past the valves, for adjustment of the latch to release the operating-member.

7. In valve construction of the character described, a housing comprising a body part having a fluid-outlet and openings for its connection with valve-casings, valve-casings loosely fitted at one of their ends, in said openings, caps loosely covering the opposite ends of said valve-casings, and a clamping appliance on said body-part, in engagement with said caps for holding the parts of the housing in their relative positions.

8. In valve-construction of the character described, a housing comprising a body-part having a fluid-outlet and openings for its connection with valve-casings, valve-casings loosely fitted at one of their ends, in said openings, and a clamping appliance securing said casings adjustably and removably to said body part.

9. In valve construction of the character described, a housing comprising a body part having a fluid-outlet and fluid-inlets, casings having cylindrical necks rotatably fitted in said fluid-inlets, and a clamping-appliance for securing the casings in their adjusted positions on the body-part.

10. In a valve-construction of the character described, valves controlling separate fluid-passages, an element adapted for adjustment to lift in its operation either valve singly or both valves simultaneously to open the passages they respectively control, a lever having one determinate movement to operate said element and another movement to effect the said adjustments of the same, and a pivoted latch adapted to automatically lock the lever in its active position against movement about its fulcrum.

11. In combination, a pair of valves controlling separate fluid-passages and having openings for the flow of fluid between spaces at opposite sides thereof, priming valves on the first-mentioned valves, controlling said openings, an element adapted for adjustment to lift in its operation either valve singly or both valves simultaneously, and a lever having one determinate movement to operate said element, and another movement to effect said adjustments of the same.

In testimony whereof we have affixed our signatures in presence of two witnesses.

HENRY A. TWIGG.
GUSTAV ANDERSON.

Witnesses:
  G. J. ROLLANDET,
  L. RHOADES.

Copies of this patent may be obtained for five cents each, by addressing the "Commissioner of Patents, Washington, D. C."